US012791366B2

(12) United States Patent
Müller et al.

(10) Patent No.: US 12,791,366 B2
(45) Date of Patent: Nov. 10, 2026

(54) FORM SEAL, DEVICE WITH A FORM SEAL, AND METHOD FOR USING A FORM SEAL

(71) Applicant: Endress+Hauser Conducta GmbH+Co. KG, Gerlingen (DE)

(72) Inventors: Andreas Müller, Ostfildern (DE); Hans Meyer, Eschach (DE); Alejandro Vaca Torres, Steinheim (DE); Hongshuo Domnick, Dresden (DE)

(73) Assignee: Endress+Hauser Conducta GmbH+Co. KG, Gerlingen (DE)

(*) Notice: Subject to any disclaimer, the term of this patent is extended or adjusted under 35 U.S.C. 154(b) by 0 days.

(21) Appl. No.: 18/961,403

(22) Filed: Nov. 26, 2024

(65) Prior Publication Data

US 2025/0172417 A1 May 29, 2025

(30) Foreign Application Priority Data

Nov. 27, 2023 (DE) ..................... 10 2023 133 004.7

(51) Int. Cl.
*G01D 11/26* (2006.01)
*B23P 19/04* (2006.01)
*F16J 15/02* (2006.01)

(52) U.S. Cl.
CPC ............ *G01D 11/26* (2013.01); *B23P 19/047* (2013.01); *F16J 15/022* (2013.01)

(58) Field of Classification Search
CPC ....... G01D 11/26; B23P 19/047; F16J 15/022; F16J 15/106; F16J 15/06; F16J 15/10
See application file for complete search history.

(56) References Cited

U.S. PATENT DOCUMENTS

| | | | | | |
|---|---|---|---|---|---|
| 3,889,840 | A * | 6/1975 | Price | G01D 11/26 73/431 |
| 4,078,813 | A * | 3/1978 | Bram | F16J 15/022 277/626 |
| 5,058,907 | A * | 10/1991 | Percebois | F16L 21/03 277/625 |
| 2016/0215884 | A1* | 7/2016 | Hettle | F16J 15/022 |
| 2017/0328473 | A1* | 11/2017 | Kim | F16J 15/02 |
| 2017/0343117 | A1* | 11/2017 | Fumanal | F16J 15/061 |
| 2018/0066756 | A1* | 3/2018 | Murai | F16J 15/062 |
| 2018/0180183 | A1* | 6/2018 | Dean | F16J 15/002 |

(Continued)

FOREIGN PATENT DOCUMENTS

| | | | |
|---|---|---|---|
| DE | 10324818 | A1 | 2/2005 |
| DE | 102016103750 | A1 | 6/2017 |

(Continued)

*Primary Examiner* — Eugene G Byrd
(74) *Attorney, Agent, or Firm* — Christopher R. Powers; Endress+Hauser (USA) Holding, Inc.

(57) ABSTRACT

A form seal for sealing a gap between a component inserted into a recess of a part exposed to the environment includes: an annular first sealing region for sealing a front region of the gap facing the environment, which comprises a front region adjoining a front side of the form seal, the external dimensions of which decrease in the direction of the front side; a second sealing region that projects inward on an inner side of the first sealing region complementary to a groove of the component; and a third sealing region for supporting the rear of the form seal, which adjoins the first sealing region on a side of the first sealing region facing away from the front side.

14 Claims, 3 Drawing Sheets

(56) References Cited

U.S. PATENT DOCUMENTS

| | | | | |
|---|---|---|---|---|
| 2019/0128424 | A1* | 5/2019 | Sato | F16J 15/025 |
| 2019/0368614 | A1* | 12/2019 | Hurst | F16J 15/3456 |
| 2020/0079444 | A1* | 3/2020 | Herbers | F16J 15/106 |
| 2020/0386313 | A1* | 12/2020 | Hwang | F16J 15/0818 |
| 2020/0408304 | A1* | 12/2020 | Ono | F16J 15/062 |
| 2022/0090682 | A1* | 3/2022 | Cox | F16J 15/028 |
| 2022/0099516 | A1* | 3/2022 | Holm | G01D 11/26 |
| 2022/0381386 | A1* | 12/2022 | Larsen | F16L 37/252 |
| 2022/0397197 | A1* | 12/2022 | Savushkin | F16J 15/061 |
| 2023/0176527 | A1* | 6/2023 | Garcin | G04B 37/11 |
| 2023/0407968 | A1* | 12/2023 | Prandoni Kistner | F16J 15/104 |

FOREIGN PATENT DOCUMENTS

| | | | | | |
|---|---|---|---|---|---|
| DE | 102016105047 | A1 | | 9/2017 | |
| DE | 102016212220 | A1 | | 9/2017 | |
| DE | 102017128291 | A1 | | 4/2019 | |
| JP | 59086754 | A | * | 11/1982 | |
| JP | 09329241 | A | * | 3/1997 | |
| JP | 11159625 | A | * | 8/1998 | |
| JP | 2021173399 | A | * | 11/2021 | F04C 29/00 |

* cited by examiner

FORM SEAL, DEVICE WITH A FORM SEAL, AND METHOD FOR USING A FORM SEAL

CROSS-REFERENCE TO RELATED APPLICATION

The present application is related to and claims the priority benefit of German Patent Application No. 10 2023 133 004.7, filed Nov. 27, 2023, the entire contents of which are incorporated herein by reference.

TECHNICAL FIELD

The present disclosure relates to a form seal for sealing a gap between a component and a part surrounding the component on the outside and on all sides, to a device including the form seal, the component and the part, and to a method for using at least one form seal in the device.

BACKGROUND

There are a variety of devices in which a component is inserted into a recess in a part surrounding the component on the outside and on all sides, such as a housing or a fitting.

Examples of this include sensors, measuring devices, measuring arrangements, and measuring systems for metrological detection of a measured variable of a medium, which usually include a component in contact with the medium during measuring operation, such as a window, a membrane or a measuring element. For example, sensors such as optical sensors, photometers and spectrometers generally have windows that are transparent to electromagnetic radiation, through which electromagnetic radiation used for measuring the measured variable passes. Examples thereof are calorimetric sensors, turbidity sensors, sensors for measuring a spectral absorption coefficient, as well as sensors for measuring a concentration of an analyte contained in the medium, such as, for example, sensors for measuring a nitrite content, a nitrate content or an ammonium content. Another example are sensors, such as conductivity sensors, whose components comprise electrode surfaces in contact with the medium during measurement, as well as sensors whose components comprise a membrane in contact with the medium during measurement operation.

These components are usually inserted into a part, such as a housing or a fitting, such that the part surrounds the component on all sides, at least in portions.

In particular, in conjunction with components that are in contact with a medium, e.g., a process medium or a measuring medium, it is generally necessary to ensure reliable sealing of a gap existing between the component and the part. Depending on the location, this seal may also have to meet special hygiene requirements.

The gap can be sealed, for example, by gluing, soldering or a press fit. However, if the component and the part are made of materials with different thermal expansion coefficients, these sealing forms can cause thermomechanical stresses depending on the temperature. An example of this is glass windows inserted into metal housings. In order to avoid damage to the seal and/or the component caused by thermomechanical stresses, it is usually necessary to limit the temperature range in which devices sealed in this way are used.

An alternative form of sealing that can be used is to insert the component into the part with the interposition of a seal, e.g., an O-ring.

In applications where there are high demands on hygiene and cleanability, the component is routinely inserted into the part with the interposition of the seal such that a small partial region of the clamped seal protrudes outward. This avoids undercuts into which medium could penetrate and which could not be easily removed again by cleaning from the outside. The disadvantage, however, is that the protruding partial region may affect the flow behavior of the medium along the outside of the component. The latter is particularly undesirable for sensors and measuring devices with components that are flush with the front of their housing, such as windows or measuring elements, where flow shadows and/or turbulence caused by the protruding partial region can have a detrimental effect on the measuring properties.

A further disadvantage of this form of sealing is that in order to achieve a front-side sealing of the gap between the component and part, it is periodically necessary to insert the seal together with the component into the part through a rear opening of the part opposite the front side.

For example, DE 10 2016 103 750 A1 describes a sensor cap that comprises a component designed as an insertable component, the end face of which has a membrane that is in contact with a medium during measuring operation. The insertable component is inserted flush with the front of a sleeve-shaped part with the interposition of a seal, e.g., an O-ring. The sealing of the end region of the gap facing the medium between the insertable component and the sleeve-shaped part is achieved by inserting the seal into an annular groove of the insertable component arranged on the outside at the front. The insertable component is then inserted together with the seal into the sleeve-shaped part through a rear opening of the sleeve-shaped part and fastened there.

However, the front sealing of the gap by a seal and the associated requirement to the component together with the seal through the rear opening of the part inevitably means that any necessary replacement of the seal must also be carried out through the rear opening of the part. For this purpose, the rear opening of the part must be made accessible. However, this requirement is not always easy to fulfill. For example, if we consider a sensor with a component that is flush with the front of a sensor housing with a seal in between, such as a window or a measuring element, replacing the seal requires opening the sensor housing. This not only involves a lot of effort but can possibly also result in other components in the sensor housing, such as electronic components, being affected and/or being exposed to unfavorable environmental conditions, such as high humidity.

SUMMARY

It is an object of the present disclosure to provide a seal for sealing a gap between a component and a part surrounding the component on the outside on all sides, which overcomes the aforementioned disadvantages of the prior art.

In this respect, it is, in particular, an object of the present disclosure to provide a seal that meets stringent requirements for hygiene and/or cleanability, which allows flush installation of the seal and/or the component, with which a high-quality seal can be achieved without sealing regions protruding outwards, and/or that is replaceable without a rear opening of the part having to be accessible for this purpose.

For this purpose, the present disclosure comprises a form seal for sealing a gap between a component that can be inserted or is inserted into a recess of a part that is open to the environment on the front side and has a groove arranged on the outside, and the part that delimits the recess on all sides on the outside, wherein the form seal:

- comprises an annular first sealing region for sealing a front region of the gap facing the environment, which comprises a front region adjoining a front side of the form seal, the outer dimensions or outer diameter of which decreases in the direction of the front side,
- comprises a second sealing region projecting radially inwardly on an inner side of the first sealing region, which is designed as a spring complementary to the groove of the component, and
- comprises a third sealing region for supporting the form seal at the rear, which third sealing region adjoins the first sealing region on a side of the first sealing region facing away from the front side.

The form seal has the advantage that it can be inserted into the recess from the outside together with the component and the component is held in the recess by the form seal. A further advantage is that the form seal can be replaced from the outside if necessary, without having to access an opening on the rear of the part.

In addition, the form seal has the advantage that it can be mounted flush with the front and thus meet high requirements for hygiene and/or cleanability. In contrast to O-rings known from the prior art, the form seal can achieve a high-quality seal of the gap without any sealing region of the form seal protruding outward.

In at least one embodiment, the first sealing region comprises, on the side of the front region facing away from the front side of the form seal, a rear region to which the second sealing region adjoins on the inside and whose radial width corresponds to a maximum radial width of the front region of the first sealing region.

According to a first development, the second sealing region has a projection formed on its inner edge and protruding in a direction facing away from the front side of the form seal.

According to a second development, the third sealing region has outer dimensions over its entire axial height in the radial direction that are smaller than the outer dimensions of the first sealing region.

A third development is that the third sealing region:

- has a cross-sectional geometry that corresponds to the basic shape of a triangle with one side facing the first sealing region and two sides each inclined relative to a longitudinal axis of the form seal,
- has a rounded or flattened rear side facing away from the first sealing region, and/or
- in its region facing the first sealing region, has a radially inwardly facing inner surface extending parallel to a radially inwardly facing inner surface area of a front region of the first sealing region adjoining the front side and/or is arranged offset outward relative to the inner surface of the front region of the first sealing region in the radial direction by a distance, wherein the distance is a predetermined distance, is 0.05 mm to 0.20 mm, and/or is dimensioned such that the inner surface area of the third sealing region only rests against the component when the form seal surrounding the component on all sides on the outside is compressed in the radial direction and/or is clamped in the recess.

According to a fourth development, the form seal has an annular circumferential groove with a rounded cross-sectional geometry on the inside in a transition region adjoining the second sealing region between the first sealing region and the third sealing region.

In a fifth development, the form seal is designed such that its front side is planar, and/or the dimensions of which are dimensioned such that the front side of the form seal facing the environment in the assembled state of the form seal is planar, is flush with a front side of the component facing the environment, and/or is flush with an outer surface of the part that surrounds the front side of the form seal on all sides.

Furthermore, the present disclosure comprises a device with a form seal according to the present disclosure, a component with a groove arranged on the outside, and a part with a recess open to the environment, into which the component is inserted with the interposition of the form seal surrounding the component on all sides on the outside.

A first further development of the device is that the recess comprises a region facing the environment, the dimensions or diameter of which decreases in the direction facing the environment.

A second further development of the device is that:

- the second sealing region has a projection formed on its inner edge and projecting in a direction away from the front side of the form seal, and
- the component has a recess adjoining the groove with a shape complementary to the shape of the projection.

A third further development of the device provides that a first cavity surrounding the third sealing region on the outside adjoins the third sealing region in the recess, and/or a second cavity surrounded on the outside by the third sealing region adjoins the third sealing region.

A further development of the device is that:

- the front side of the form seal facing the environment is planar, is flush with a front side of the component facing the environment, and/or is flush with an outer surface of the part that surrounds the front side of the form seal on all sides, and/or
- the third sealing region adjoins a stop surface on its side facing away from the first sealing region, wherein:
- the form seal has, in its radial region comprising the third sealing region, an axial height in the axial direction adapted to a depth of the radial region of the recess delimited at the rear by the stop surface,
- the stop surface is a surface of the part having the recess or of another part of the device, and/or
- at least an outer edge of the component rests on the stop surface.

A fifth further development of the device provides that the device is a sensor, a measuring instrument, a measuring device, a measuring arrangement or a measuring system for the metrological detection of a measured variable of a medium,

- the component is a window, a membrane, a sensor element, a sensor element comprising at least one electrode, or a probe, and/or
- the part is a housing or a fitting.

Further, the present disclosure comprises a method for using at least one form seal according to the present disclosure in a device according to the present disclosure, wherein the method of use comprises an assembly method in which:

- the form seal is pushed onto the component such that the form seal surrounds the component on all sides on the outside and the second sealing region designed as a spring engages in the groove of the component,
- the form seal is compressed in the radial direction by pushing the component together with the form seal pushed thereon in the axial direction into a sleeve whose cross-sectional area decreases in the axial direction, wherein a smallest cross-sectional area of the sleeve present at one end of the sleeve is less than or equal to a cross-sectional area of an opening of the recess adjoining the environment, and the component, together with the radially compressed form seal, is inserted into the recess of the part through the sleeve positioned accordingly in front of the recess.

A further development of the method comprises a method in which:

the component together with the form seal pushed thereon is pushed into the sleeve by means of a punch and inserted through the sleeve into the recess, and the punch has a punch surface on the end face, which comprises an inner surface and an edge surface surrounding the inner surface, wherein:

the inner surface has a shape adapted to a shape of a front side of the component facing the environment, and the edge surface has a shape adapted to the shape of the front side of the form seal and protrudes in the axial direction by a predetermined distance or a distance of 0.1 mm to 0.5 mm from the inner surface.

According to a further development of the method, the form seal is replaced at least once with an identical replacement seal by removing the form seal from the recess using a tool or a hook, and the replacement seal is mounted in the recess together with the component or an identical replacement component by means of the assembly method.

BRIEF DESCRIPTION OF THE DRAWINGS

The present disclosure and its advantages will now be explained in detail using the figures in the drawing, which show several examples of embodiments. The same elements are indicated by the same reference numbers in the figures.

DETAILED DESCRIPTION

Figure 1:
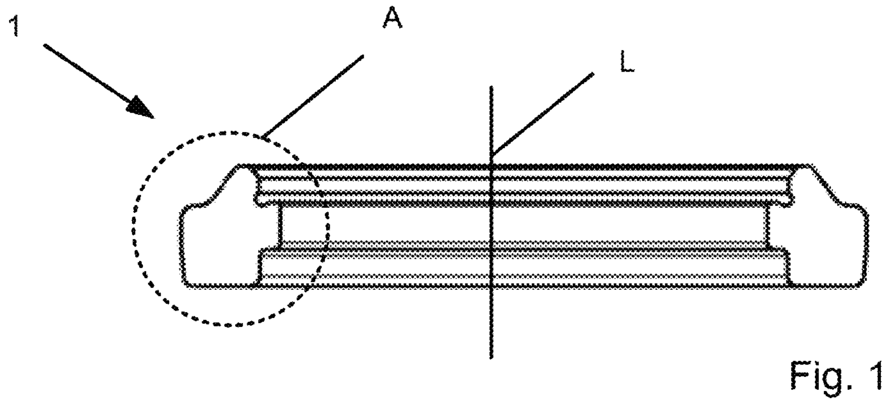
FIG. 1 shows a sectioned form seal.
Figure 2:
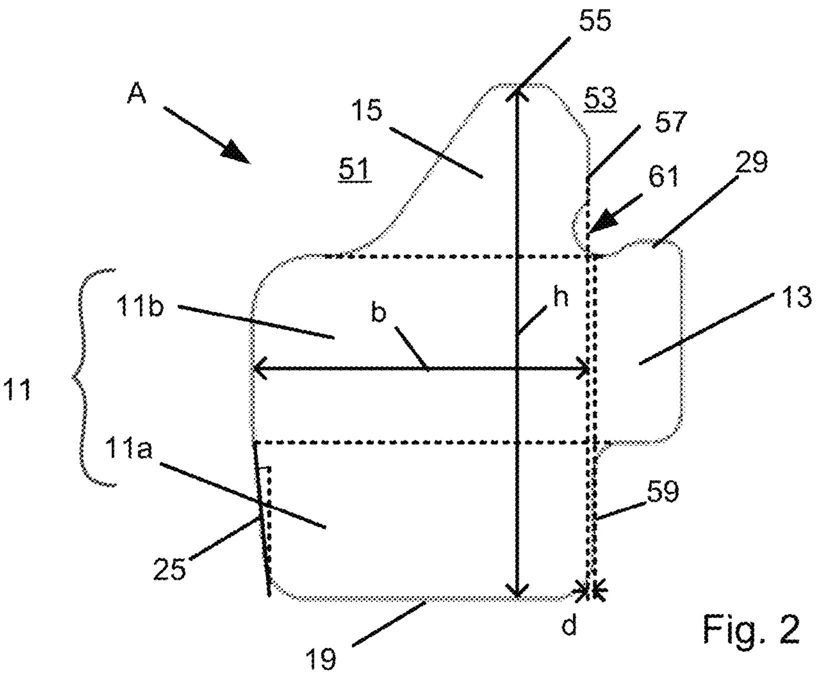
FIG. 2 shows a detail view of a cross-sectional area of the form seal of FIG. 1.

The present disclosure relates to a form seal 1 for sealing a gap between a component 5 that can be inserted or is inserted into a recess 3 of a part 7 that is open to the environment on the front side and the part 7 that delimits the recess 3 on all sides on the outside. An exemplary embodiment of the form seal 1 is shown in FIG. 1. An enlarged view of a cross-section A of the form seal 1 circled in FIG. 1 is shown in FIG. 2.

The form seal 1 described here can be used in devices 100 of the most varied types, such as sensors, measuring instruments, measuring devices, measuring arrangements and measuring systems for the metrological detection of a measured variable of a medium, each of which has a part 7, such as a housing or a fitting, with a recess 3 open to the environment and a component 5, such as a probe, a membrane, a measuring element or a window, inserted at least partially into the recess 3 with the form seal 1 interposed.

Figure 3:
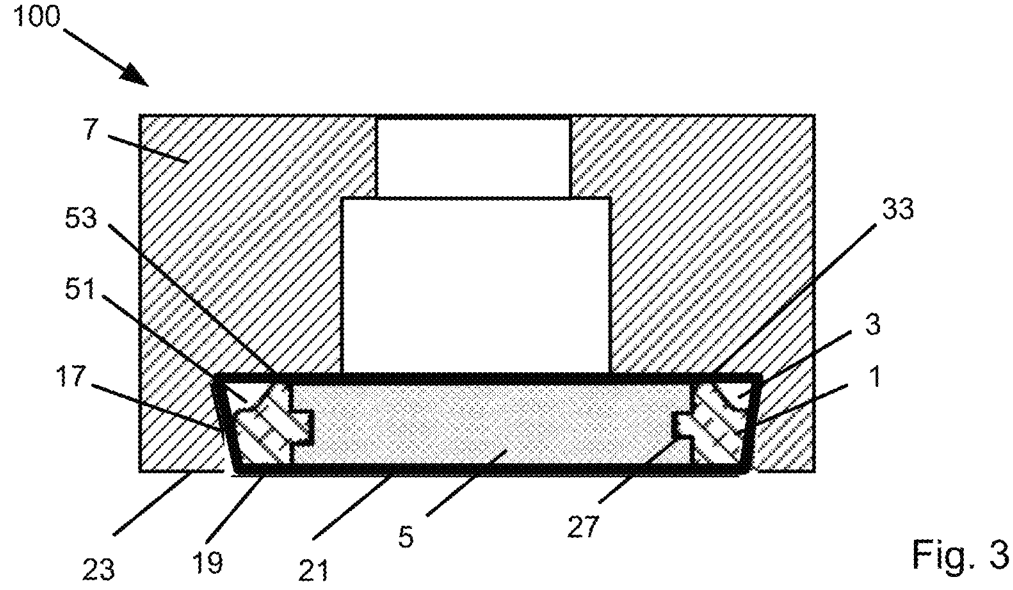
FIG. 3 shows a section of a device comprising the form seal of FIG. 1.
Figure 4:
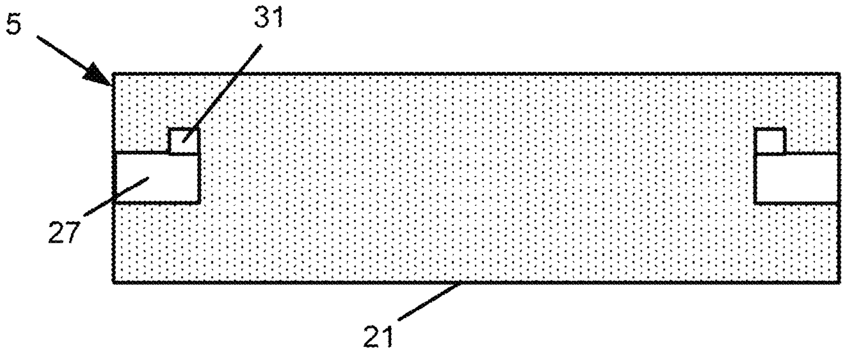
FIG. 4 shows a component of the device in FIG. 3.
Figure 5:
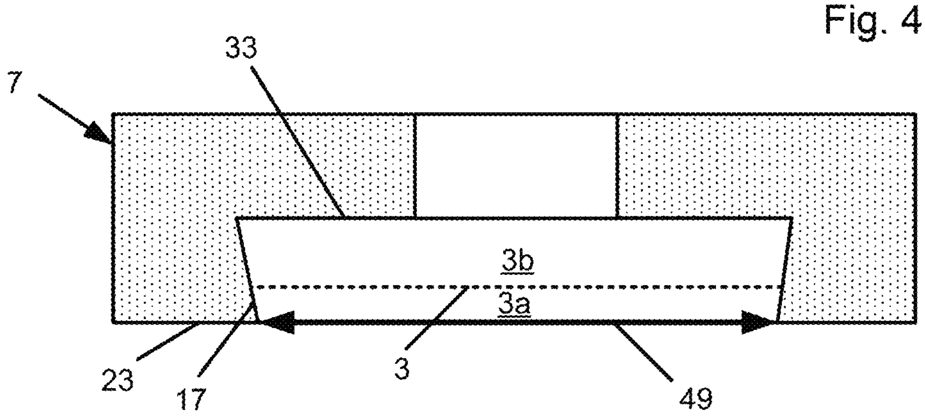
FIG. 5 shows a recess in the part of the device in FIG. 3.

A section of an exemplary embodiment of the device 100 comprising the form seal 1, the recess 3 of the part 7 and the component 5 is shown in FIG. 3. FIG. 4 shows the component 5 of the device 100 as an individual part, and FIG. 5 shows the recess 3 in the part 7. The device 100 can of course also have two or more recesses 3 for receiving one or each of the components 5 and/or two or more parts 7, each having at least one such recess 3.

Depending on the type of device 100, the component 5 is, for example, a sensor element, such as a membrane, e.g., an analyte-sensitive membrane of a sensor, e.g., an optochemical sensor, or a sensor element comprising at least one electrode, such as a sensor element comprising at least one measuring electrode of a conductivity sensor.

In conjunction with devices 100 designed as optical measuring devices or as optical sensors, the component 5 is, for example, a window through which, by means of the correspondingly designed devices 100, transmission radiation is sent into a medium adjoining the outside of the window and/or through which measurement radiation is received. In this case, the device 100, which is only partially shown in FIG. 3, is designed, for example, as an optical sensor, for example as a photometer or as a spectrometer, through whose component 5, which is designed as a window, electromagnetic radiation used to measure a measured variable passes. In this case, the optical sensor is, for example, a calorimetric sensor, a turbidity sensor, a sensor for measuring a spectral absorption coefficient, or a sensor for measuring a concentration of an analyte contained in the medium, such as, for example, a sensor for measuring a nitrite content, a nitrate content or an ammonium content.

Figure 6:
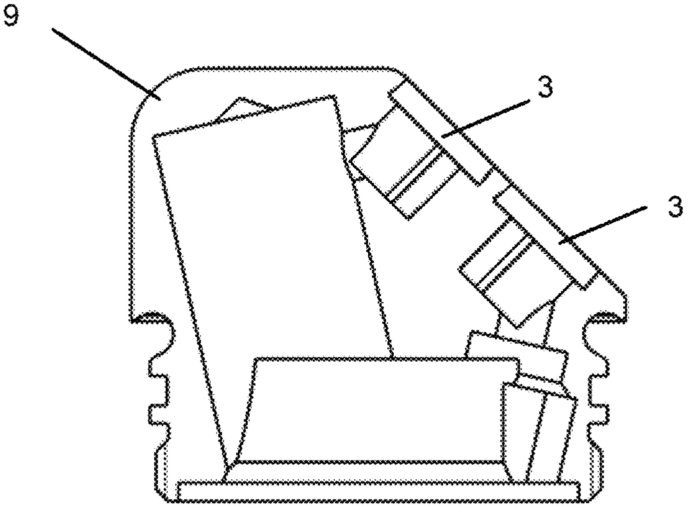
FIG. 6 shows a housing with two recesses.

Depending on the type of device 100, the part 7 is, for example, a fitting or a housing with at least one recess 3 for receiving a component 5. FIG. 6 shows, as an exemplary embodiment, a housing 9 that has two recesses 3 into each of which one of the previously described components 5 can be inserted with the interposition of one of the form seals 1 described here in the manner described below.

As shown in FIG. 2, the form seal 1 comprises an annular first sealing region 11, a second sealing region 13 projecting radially inward on an inner side of the first sealing region 11, and a third sealing region 15.

The form (e.g., molded) seal 1, or the first sealing region 11, the second sealing region 13 and/or the third sealing region 15 each consist of a sealing material, e.g., an elastomer, a plastic, such as polytetrafluoroethylene (PFTE), polyetheretherketone (PEEK) or polypropylene (PP) or another sealing material.

The first sealing region 11 is designed to seal a front region of the gap facing the environment and located in the recess 3. Accordingly, the dimensions of the first sealing region 11 are preferably dimensioned such that the first sealing region 11, when mounted in the device 100, is clamped in the front region of the gap in the radial direction between an inner surface area 17 of the part 7, which delimits the recess 3 on all sides on the outside, and an outer surface area of the component 5.

Optionally, a front side 19 of the first sealing region 11 facing the environment in the assembled state of the form seal 1 has, for example, a planar shape. Alternatively or additionally, the dimensions of the form seal 1 are optionally dimensioned, for example, such that the front side 19 of the first sealing region 11 is substantially flush with a front side 21 of the component 5 facing the environment, and/or is substantially flush with an outer surface 23 of the part 7 surrounding the front side 19 of the form seal 1 on all sides.

This avoids undercuts into which medium could penetrate that could not be easily removed again by cleaning from the outside. In contrast to O-rings known from the prior art, which routinely have to be clamped such that a partial region of the O-ring protrudes from the gap to be sealed in order to avoid undercuts, the dimensions of the form seal 1 described here are optionally dimensioned, for example, such that the front side 19 of the first sealing region 11 is substantially planar in the assembled state of the form seal 1. This avoids the disadvantages previously described in connection protruding partial regions of O-rings. The latter is advantageous in particular in devices 100 for the metrological detection of a measured variable of a medium, in which protruding partial regions can have a detrimental effect on the measuring properties.

The first sealing region 11 has, at least in a front region 11*a* adjoining its front side 19, decreasing external dimensions in the axial direction extending in the direction of the front side 19.

In this respect, the recess 3 of the part 7 of the device 100 preferably has decreasing dimensions in the axial direction towards the environment, at least in its region 3*a* facing the environment.

FIGS. 1 and 2 show an embodiment in which the front region 11*a* of the first sealing region 11 has a conical outer surface area 25. For this purpose, the front region 11*a* has an outer diameter that decreases in the axial direction, in the direction of the front side 19. FIG. 5 shows the recess 3 of the part 7, which is designed to complement this, and which has a diameter that decreases overall or at least in its region 3*a* facing the environment in the axial direction facing the environment. Accordingly, the region 3*a* of the recess 3 facing the environment is delimited on all sides by a conical region of the inner surface area 17 of the part 7.

This shape, which is actually disadvantageous with regard to the insertion of the form seal 1 from the outside through an opening 49 of the recess 3 facing the environment, offers the advantage that the inner surface area 17 of the part 7, which delimits the recess 3 on the outside, forms a counter bearing for the form seal 1 inserted into the recess 3, on which the outer surface area 25 of the first sealing region 11 rests in the inserted state. This causes a fixation of the form seal 1 in the recess 3 in addition to the radial clamping of the first sealing region 11 in the front region of the gap, which prevents the form seal 1 clamped in the gap from emerging from the recess 3 in the direction facing the environment.

In order to achieve this fixation acting in the axial direction, the first sealing region is optionally designed, for example, in such a way that it has decreasing external dimensions over its entire axial height in the axial direction running towards the front side. In this case, the front region is identical to the first sealing region.

FIGS. 1 and 2 show an alternative embodiment in which the first sealing region 11 comprises, on the side of the front region 11*a* facing away from the front side 19 of the form seal 1, a rear region 11*b*, to which the second sealing region 13 is adjacent on the inside and whose radial width b corresponds to the largest radial width of the front region 11*a* of the first sealing region 11. The large radial width b achieves a high degree of stability in the transition region between the first sealing region 11 and the second sealing region 13. At the same time, the limitation of the radial width b limits the radial compression of the rear region 11*b* required for inserting the form seal 1 into the recess 3.

FIGS. 1 and 2 show an exemplary embodiment in which the rear region 11*b* has an outer diameter that is constant over its axial height and is equal to the maximum outer diameter of the front region 11*a*. FIG. 5 shows the recess 3 that is designed to complement this, to the region 3*a* of which facing the environment, in the direction facing away from the environment, a rear region 3*b* of the recess 3 that receives the rear region 11*b* of the first sealing region 11 and the third sealing region 15 adjoins. In FIG. 5, the rear region 3*b* of the recess 3 also has a diameter increasing in the direction facing away from the environment. Alternatively, it can also have a different shape.

The second sealing region 13 is designed as a spring that, when the form seal 1 is pushed onto the component 5, engages in a complementary outer groove 27 of the component 5. This creates a positive connection between the form seal 1 and the component 5. This offers the advantage that by pushing the form seal 1 onto the component 5, an assembly is formed that can then be inserted into the recess 3 from the outside. A further advantage is that the component 5 is held in the recess 3 by the form seal 1 clamped in the part 7 and the tongue and groove connection.

An optional embodiment is that the second sealing region 13 has a projection 29 formed on its inner edge and protruding in the direction facing away from the front side 19 of the form seal 1. In conjunction with this optional design, the component 5 has, for example, a recess 31 adjoining the groove 27. As shown in FIG. 4, the recess 31 preferably has a shape complementary to the shape of the projection 29. This optional design offers the advantage that the projection 29 of the second sealing region 13 engages in the recess 31 or snaps into the recess 31 when the form seal 1 is pushed onto the component 5. This strengthens the positive mechanical connection between the form seal 1 and the component 5.

The third sealing region 15 adjoins the first sealing region 11 on a side of the first sealing region 11 facing away from the front side 19 of the form seal 1. The third sealing region 15 is designed as a rear support of the form seal 1. In this respect, the third sealing region 15 in the device 100 adjoins, for example, a stop surface 33 of the device 100, in particular of the part 7, which stop surface delimits at least one outer edge region of the recess 3 facing away from the environment. This limits the insertion depth to which the form seal 1 can be inserted into the recess 3 both during its assembly and in the installed state.

In order to achieve the rear support, the form seal 1 has, in its radial region comprising the third sealing region 15, an axial height h in the axial direction which is adapted to a depth of the radial region of the recess 3 delimited at the rear by the stop surface 33.

As shown in FIG. 3, form seals 1 according to the present disclosure are used, for example, in devices 100 of the type described above. In this respect, the present disclosure also comprises a method for using at least one of the form seals 1 described above with reference to FIGS. 1 and 2 in one of the devices 100 described above with reference to FIGS. 3 to 6.

Figure 7:
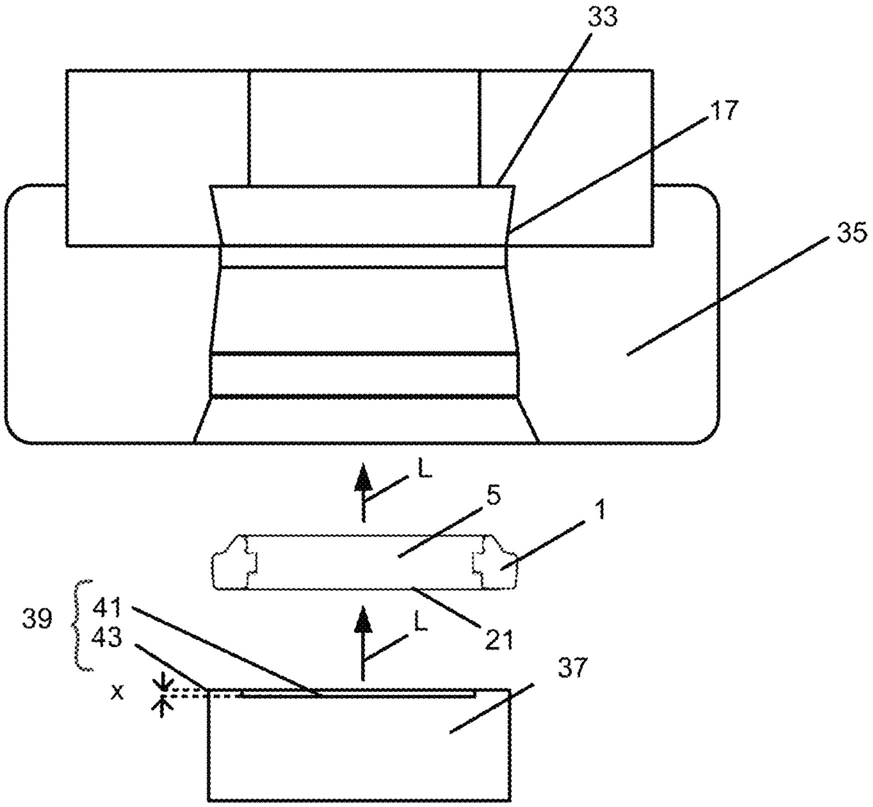
FIG. 7 illustrates a method for assembling the form seal of FIG. 1.

This method of use comprises an assembly method shown in FIG. 7. The assembly method comprises a first method step in which the form seal 1 is mounted on the component 5. For this purpose, the form seal 1 is pushed onto the component 5 such that the form seal 1 surrounds the component 5 on all sides and the second sealing region 13 designed as a spring engages in the groove 27 of the component 5.

Subsequently, the form seal 1 mounted on the component 5 is compressed in the radial direction. For this purpose, for example, the component 5, together with the form seal 1 pushed thereon, is pushed in the axial direction into a sleeve 35 whose cross-sectional area decreases in the axial direction. The smallest cross-sectional area of the sleeve 35 present at one end of the sleeve 35 is less than or equal to, preferably substantially equal to, the cross-sectional area of the opening 49 of the recess 3 adjoining the environment.

The component 5 is then inserted from the outside into the recess 3 of the part 7 together with the form seal 1 compressed in the radial direction. This step is carried out, for example, such that the component 5 together with the compressed form seal 1 is inserted into the recess 3 of the part 7 through the sleeve 35 positioned accordingly in front of the recess 3. The insertion depth of the form seal 1 in the recess 3 is limited by the stop of the third sealing region 15 on the stop surface 33 of the device 100.

Depending on the type of device 100 and/or component 5, the stop surface 33 also serves as stop surface 33 for the component 5. In this case, the stop surface 33 of the part 7 extends radially inwardly such that at least one outer edge of the component 5 of the device 100 rests against the stop surface 33. Alternatively, the device 100 may also have a stop surface of the part 7 or of another component of the device 100, which stop surface is separate from the stop surface 33 and against which the component 5 in the device 100 rests.

Both the pushing in of the assembly formed by the component 5 and the form seal 1 pushed thereon as well as the pushing of this assembly through the sleeve 35 into the recess 3 can be done, depending on the axial length of the sleeve 35, for example, by hand or by means of a suitably shaped tool. As an example, FIG. 7 shows a punch 37 with which the component 5, together with the form seal 1 pushed thereon, is pushed into the sleeve 35 for radial compression of the form seal 1 and is then inserted through the sleeve 35 into the recess 3. As shown in FIG. 7, the punch 37 has, for example, a punch surface 39 on the end face, which comprises an inner surface 41 and an edge surface 43 surrounding the inner surface 41.

Figure 8:
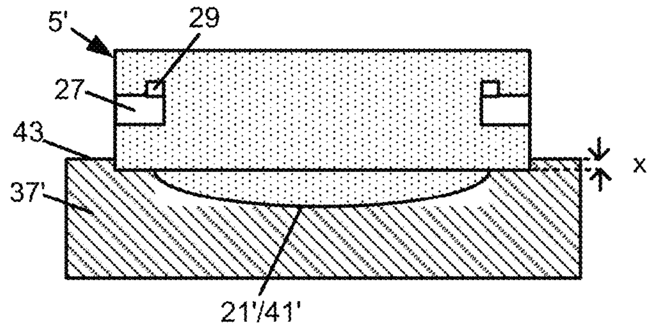
FIG. 8 shows a component with a curved front side and a punch.
Figure 9:
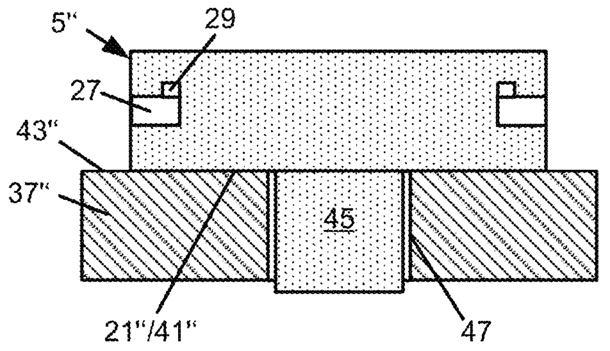
FIG. 9 shows a component with an extension and a punch with a recess.

The inner surface 41 preferably has a shape adapted to the shape of the front side 21 of the component 5 facing the environment. As shown in FIG. 7, the inner surface 41 is designed as a planar surface in connection with components 5 with a planar front side 21, such as windows. FIG. 8 shows an alternative embodiment in which the front side 21' of the component 5' is curved outward and the inner surface 41' of the punch 37' has a complementary shape. FIG. 9 shows a further alternative embodiment in which the component 5" comprises an extension 45 protruding from a front side 21", which is annular here. In this variant, the punch 37" has a recess 47, such as a cutout or a bore, for receiving the extension 45. Accordingly, the inner surface 41" of the punch 37" is annular here and has a shape complementary to the annular front side 21" of the component 5".

Irrespective of the design of the punch 37, 37', 37" adapted to the geometry of the component 5, 5', 5", the edge surface 43 of the punch surface 39 of the punch 37, 37', 37" has a shape adapted to the shape of the front side 19 of the form seal 1.

FIGS. 7 and 8 show designs in which the edge surface 43 protrudes in the axial direction by a predetermined distance x from the inner surface 41. As shown in FIGS. 7 and 8, the punch 37, 37' can for this purpose have on the outside, for example, a shoulder of corresponding height, the end face of which forms the edge surface 43 of the punch surface 39. This embodiment facilitates the radial compression of the form seal 1 when pushed through the sleeve 35 and reduces the forces acting on the form seal 1. The protruding edge surface 43 or the step reduces the deformation of the form seal during installation and thus prevents damage to the form seal 1. In addition, the protruding edge surface 43 ensures a torsional stress-free end position of the form seal 1 in the recess 3. Depending on the size of the form seal 1, a small distance x is sufficient to achieve this effect, such as a distance x of 0.1 mm to 0.5 mm.

A further advantage is that the form seal 1 is compressed in the axial direction by the protruding edge surface 43 during installation and assumes the clamped shape intended for it after the removal of the punch 37, 37'. This also ensures that the form seal 1, in the assembled state, is supported on the rear side on the stop surface 33 and/or is clamped between the stop surface 33 and the inner surface 17 of the part 7.

FIG. 9 shows an alternative design in which the edge surface 43" is arranged at the same height as the immediately adjacent outer edge of the inner surface 41" of the punch 37".

Alternatively or additionally to the shaping of the punch surface 39 shown in FIGS. 7 and 8, further measures can optionally be taken to reduce mechanical loads acting on the form seal 1 during assembly. An optional measure is a corresponding optimization of the shape of the form seal 1.

For this purpose, an embodiment of the form seal is first considered, the dimensions of which are dimensioned such that the form seal inserted into the recess completely or at least almost completely fills a partial space of the recess located on the side of the first sealing region facing away from the environment. In this embodiment, the first sealing region and the third sealing region must be compressed radially over their entire axial height during assembly to such an extent that they can be introduced into the recess through the front opening of the recess. During this process, compression forces are exerted on all sealing regions with external dimensions exceeding the cross-sectional area of the opening, which compression forces are greater the larger the external dimensions are in comparison to the cross-sectional area of the opening.

FIGS. 1 and 2 show an alternative design in which the third sealing region 15 has external dimensions, such as an external diameter, over its entire axial height in the radial direction that are smaller than the external dimensions of the first sealing region 11. This embodiment offers the advantage over the previously mentioned embodiment that the third sealing region 15 can fulfill its function as a rear support without having to be compressed in the radial direction during assembly of the form seal 1. This significantly reduces the mechanical stress on the form seal 1 during insertion and avoids corresponding assembly-related impairments of the form seal 1.

In conjunction with this embodiment of the third sealing region 15, the recess 3 of the device 100, as shown in FIGS. 3 and 5, is optionally dimensioned such that a first cavity 51 surrounding the third sealing region 15 on the outside remains in the recess 3.

Alternatively or additionally, the third sealing region 15 is optionally dimensioned, for example, such that a second cavity 53 surrounded on the outside by the third sealing region 15 adjoins the third sealing region 15 in the device 100.

The first cavity 51 as well as the second cavity 53 each offer the advantage that they are available as a swelling space into which sealing material of the form seal 1 can expand as needed, in particular, when the ambient temperature changes. As a result, the form seal 1 is protected from damage, in particular, also at very high temperatures and also during large temperature fluctuations, and is held in its position within the recess 3. The latter is, in particular, advantageous when the component 5 and the part 7 consist of materials with different thermal expansion coefficients, which may, among other things, result in temperature-dependent changes in the gap width of the gap sealed by the form seal 1. The swelling spaces offer the advantage that reliable sealing of the gap by the form seal 1 is ensured in an even larger temperature range without sealing material protruding outwards. In addition, the expansion of sealing material into the swelling spaces reduces thermomechanical stresses that may occur depending on the temperature and that could otherwise have a detrimental effect on the form seal 1 and/or the component 5.

The previously described optional designs of the third sealing region 15 can be achieved by different shapes of the cross-sectional area of the third sealing region 15. FIGS. 1 and 2 show an embodiment in which the cross-sectional geometry of the third sealing region 15 corresponds to the basic shape of a triangle having one side facing the first sealing region 11 and two sides each inclined relative to the longitudinal axis L of the form seal 1.

The cross-sectional geometry is optionally designed, for example, such that the third sealing region 15, in its region facing away from the first sealing region 11 and corresponding to one of the three vertices of the triangle, has a rounded or flattened rear side 55, which is advantageous, in particular, with regard to the rear support of the form seal 1 in the recess 3.

Alternatively or additionally, the third sealing region 15 is designed, for example, such that in its region facing the first sealing region 11 it has a radially inwardly facing inner surface area 57 that runs parallel to a radially inwardly facing inner surface area 59 of the front region 11*a* of the first sealing region 11.

An optional embodiment is that the inner surface area 57 of the third sealing region 15 extends radially outwardly offset relative to the inner surface area 59 of the front region 11*a* of the first sealing region 11 in the radial direction by a predetermined distance d, e.g., a distance d of 0.05 mm to 0.20 mm. The distance d is dimensioned such that the inner surface area 57 of the third sealing region 15 only rests against the component 5 when the form seal 1 surrounding the component 5 on all sides is compressed in the radial direction and/or clamped in the recess 3.

A further optional design is that the form seal 1 has an annular circumferential groove 61 with a rounded cross-sectional geometry on the inside in a transition region adjoining the second sealing region 13 between the first sealing region 11 and the third sealing region 15. The groove 61 designed in this way as a stress relief groove offers the advantage that it facilitates the deformation of the form seal 1 during assembly and thereby reduces stress peaks occurring within the form seal 1.

Irrespective of the shape of the third sealing region 15, the installation of the form seal 1 in the recess 3 that is open to the environment and thus easily accessible from the outside offers the advantage that no access is required to a region of the device 100 located on the side of the recess 3 facing away from the environment. This offers the advantage that the form seal 1 can be replaced if necessary without having to open the device 100.

In this respect, an optional design of the previously described method of use comprises, for example, a further method step in which the form seal 1 mounted in the recess 3 of the device 100 in the manner described above is replaced at least once, when required or at predetermined times.

In this case, the process is carried out in such a way that the form seal 1 is removed from the recess 3 by means of a tool, such as a hook. For this purpose, O-ring hooks known from the prior art for removing O-rings can be used. The form seal 1 is then replaced by an identical replacement seal, which is mounted in the recess 3 together with the component 5 or an identical replacement component using the assembly method described above.

Just like the installation of the form seal 1 in the recess 3 that is open to the environment and thus easily accessible from the outside, the replacement of the form seal 1 also offers the advantage that no access to a region of the device 100 located on the side of the recess 3 facing away from the environment is required. This offers the advantage that the device 100 does not have to be opened or at least partially dismantled for replacement.

We claim:

1. A form seal for sealing a gap between a component, which can be inserted or is inserted into a recess of a part and includes a groove arranged on an outer edge, and the part, which delimits the recess on all sides on the outside, which recess is open to the environment on a front side, the form seal comprising:

an annular first sealing region adapted to seal a front portion of the gap, which faces the environment, wherein the first sealing region includes a front region adjoining a front side of the form seal, whose outer dimensions or outer diameter decrease in a direction of the front side;

a second sealing region projecting radially inward from an inner side of the first sealing region and adapted as a tongue, which is complementary to the groove of the component;

a third sealing region adapted to support a rear side of the form seal, which third sealing region adjoins the first sealing region on a boundary of the first sealing region facing away from the front side; and an annular circumferential groove with a rounded cross-sectional geometry in an inner side in a transition region between the first sealing region and the third sealing region adjoining the second sealing region.

2. The form seal according to claim 1, wherein the first sealing region includes, on the boundary of the front region facing away from the front side of the form seal, a rear region which is adjoined on the inner side by the second sealing region and whose radial width corresponds to a maximum radial width of the front region of the first sealing region.

3. The form seal according to claim 1, wherein the second sealing region includes a projection formed on an inner edge thereof, which projects in a direction facing away from the front side of the form seal.

4. The form seal according to claim 1, wherein the third sealing region has, over an entire axial height thereof, external dimensions in a radial direction that are smaller than the outer dimensions of the first sealing region.

5. The form seal according to claim 1, wherein the third sealing region includes:

a cross-sectional geometry that corresponds to a generally triangular shape with one side facing the first sealing region and two sides each inclined relative to a longitudinal axis of the form seal, a rounded or flattened rear side facing away from the first sealing region; and/or on the one side facing the first sealing region, a radially inwardly facing inner surface area extending parallel to a radially inwardly facing inner surface area of the front region of the first sealing region adjoining the front side and/or is arranged offset outward relative to the inner surface of the front region of the first sealing region in the radial direction by a distance, wherein the distance is a predetermined distance, is 0.05 mm to 0.20 mm, and/or is dimensioned such that the inner surface area of the third sealing region only rests against the component when the form seal surrounding the component on all sides on the outside is compressed in the radial direction and/or is clamped within the recess.

6. The form seal according to claim 1, wherein the front side is planar and/or is dimensioned such that the front side of the form seal facing the environment in an assembled state of the form seal is planar, is flush with a front side of the component facing the environment, and/or is flush with an outer surface of the part surrounding the front side of the form seal on all sides.

7. A device comprising: a form seal, comprising: an annular first sealing region sealing a front portion of a gap, which faces the environment, wherein the first sealing region includes a front region adjoining a front side of the form seal, whose outer dimensions or outer diameter decrease in a direction of the front side; a second sealing region projecting radially inward from an inner side of the first sealing region and engaging in a groove of a component, wherein the second sealing region is adapted as a tongue, which is complementary to the groove of the component; and a third sealing region supporting a rear side of the form seal, which third sealing region adjoins the first sealing region on a boundary of the first sealing region facing away from the front side; a component with an annular groove arranged on the outer edge; and a part with a recess that is open to the environment on a front side, into which recess the component is introduced with interposition of the form seal surrounding the component on all lateral sides wherein the recess includes a region facing the environment, whose dimensions or diameter decrease in a direction facing the environment, and wherein the form seal is configured complementary to the recess so as to secure the component inside the recess and to seal a gap between the component and the part, which delimits the recess on all lateral sides.

8. The device according to claim 7, wherein:
- the second sealing region includes a projection formed on an inner edge thereof, which projects in a direction facing away from the front side of the form seal; and
- the component includes a recess adjoining the groove with a shape complementary to a shape of the projection.

9. The device according to claim 7, wherein the part recess of the part includes a first cavity adjoining the third sealing region in the recess and surrounding the third sealing region on the outside, and/or a second cavity adjoining the third sealing region in the recess that is surrounded on the outside by the third sealing region.

10. The device according to claim 7, wherein:
- the front side of the form seal facing the environment is planar, is flush with a front side of the component facing the environment, and/or is flush with an outer surface of the part surrounding the front side of the form seal on all sides on the outside; and/or
- the third sealing region adjoins a stop surface on the side facing away from the first sealing region, wherein at least one of:
  - the form seal has, in a radial region comprising the third sealing region, an axial height in the axial direction adapted to a depth of the radial region of the part recess delimited at the rear by the stop surface;
  - the stop surface is a surface of the part including the part recess or of another part of the device; and
  - at least an outer edge of the component rests against the stop surface.

11. The device according to claim 7, wherein at least one of:
- the device is a sensor, a measuring instrument, a measuring device, a measuring arrangement, or a measuring system for metrological detection of a measured variable of a medium;
- the component is a window, a membrane, a sensor element, a sensor element including at least one electrode, or a probe; and
- the part is a housing or a fitting.

12. A method for assembling the device according to claim 7, the method comprising:
- pushing the form seal onto the component such that the form seal surrounds the component on all lateral sides on the outside, wherein the second sealing region engages in the groove of the component;
- compressing the form seal in the radial direction by pushing the component, including the form seal pushed thereon, in the axial direction into a sleeve whose cross-sectional area decreases in the axial direction, wherein a smallest cross-sectional area of the sleeve present at one end of the sleeve is less than or equal to a cross-sectional area of an opening of the recess adjoining the environment; and
- inserting the component, including the radially compressed form seal, into the recess of the part through the sleeve, which is positioned accordingly in front of the recess,
- wherein the component, the part, and the form seal in an assembled state comprise a device, wherein the device is a sensor, a measuring instrument, a measuring device, a measuring arrangement, or a measuring system for metrological detection of a measured variable of a medium.

13. The method according to claim 12, wherein:
- the component, including the form seal pushed thereon, is pushed into the sleeve using a punch and then inserted through the sleeve into the recess; and
- the punch includes a punch surface on an end face thereof, which includes an inner surface and an edge surface surrounding the inner surface, wherein:
  - the inner surface has a shape adapted to a shape of a front side of the component facing the environment; and
  - the edge surface has a shape adapted to the shape of the front side of the form seal and protrudes in the axial direction by a predetermined distance or a distance of 0.1 mm to 0.5 mm from the inner surface.

14. The method according to claim 12, further comprising replacing a previously assembled form seal with an identical replacement seal by:
- removing the form seal from the recess using a tool; and
- assembling the replacement seal into the recess with the component or an identical replacement component according to method of claim 12.

* * * * *